(12) United States Patent
Sahai et al.

(10) Patent No.: US 12,408,168 B1
(45) Date of Patent: Sep. 2, 2025

(54) WIRELESS CONFIGURATION BASED ON ANTENNA CONNECTION STATUS

(71) Applicant: Meta Platforms Technologies, LLC, Menlo Park, CA (US)

(72) Inventors: Achaleshwar Sahai, San Jose, CA (US); Ping Wang, Redmond, WA (US); Madhusudan Kinthada Venkata, South San Diego, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 298 days.

(21) Appl. No.: 17/732,025

(22) Filed: Apr. 28, 2022

(51) Int. Cl.
- *H04W 72/20* (2023.01)
- *H04B 7/0417* (2017.01)
- *H04L 5/00* (2006.01)
- *H04W 92/18* (2009.01)

(52) U.S. Cl.
CPC .......... *H04W 72/20* (2023.01); *H04B 7/0417* (2013.01); *H04L 5/0057* (2013.01); *H04W 92/18* (2013.01)

(58) Field of Classification Search
CPC .... H04W 72/20; H04W 92/18; H04B 7/0417; H04L 5/0057
See application file for complete search history.

(56) References Cited

U.S. PATENT DOCUMENTS

| | | | |
|---|---|---|---|
| 10,276,923 B1 * | 4/2019 | Eller | H04B 1/18 |
| 2008/0130599 A1 * | 6/2008 | Horikoshi | H04B 7/0817 370/338 |
| 2013/0210368 A1 * | 8/2013 | Lee | H04B 17/102 455/67.11 |
| 2022/0209798 A1 * | 6/2022 | Dawson | H04B 1/0458 |
| 2023/0345281 A1 * | 10/2023 | Xu | H04W 36/0088 |

FOREIGN PATENT DOCUMENTS

| | | | | |
|---|---|---|---|---|
| WO | WO-2008023096 A1 * | 2/2008 | | G06K 7/0008 |
| WO | WO-2008023097 A1 * | 2/2008 | | H04B 17/0042 |

\* cited by examiner

*Primary Examiner* — Peter P Chau
(74) *Attorney, Agent, or Firm* — Foley & Lardner LLP (57) ABSTRACT

Disclosed herein are related to adaptively configuring a wireless device, according to a connection status of one or more antennas. In one aspect, the wireless device includes a wireless interface, and a plurality of antenna ports coupled to the wireless interface. In one aspect, the wireless device includes one or more sensors coupled to the plurality of antenna ports. The one or more sensors may be configured to provide an indication of whether each of the plurality of antenna ports is connected to a corresponding antenna. In one aspect, the wireless device includes a processor configured to set a configuration of the wireless interface, according to the indication.

18 Claims, 4 Drawing Sheets

```
┌─────────────────────────────────────────────────────────────┐
│ Detect, by one or more sensors, a connection status of one  │
│ or more antenna ports                                       │
│                            410                              │
└─────────────────────────────────────────────────────────────┘
                              │
                              ▼
┌─────────────────────────────────────────────────────────────┐
│ Generate, by the one or more sensors, an indication         │
│ indicating the connection status                            │
│                            420                              │
└─────────────────────────────────────────────────────────────┘
                              │
                              ▼
┌─────────────────────────────────────────────────────────────┐
│ Set a configuration of a wireless interface, according to   │
│ the indication                                              │
│                            430                              │
└─────────────────────────────────────────────────────────────┘
                              │
                              ▼
┌─────────────────────────────────────────────────────────────┐
│ Generate channel state feedback, according to the indication│
│                            440                              │
└─────────────────────────────────────────────────────────────┘
```

FIG. 4

WIRELESS CONFIGURATION BASED ON ANTENNA CONNECTION STATUS

FIELD OF DISCLOSURE

The present disclosure is generally related to wireless communication, including but not limited to configuring a wireless device according to a connection status of one or more antennas.

BACKGROUND

A wireless device may include multiple antennas for wireless communication. For example, the wireless device may include one or more receiver circuitries coupled to multiple antennas for multiple-input and multiple-output (MIMO) communication. Communication through multiple antennas may achieve higher throughput, lower bit error rate, better directivity, and higher spectral efficiency than communication through a single antenna.

SUMMARY

Various embodiments disclosed herein are related to a device for wireless communication. In some embodiments, the device includes a wireless interface, and a plurality of antenna ports coupled to the wireless interface. In some embodiments, the device includes one or more sensors coupled to the plurality of antenna ports. The one or more sensors may be configured to provide an indication of whether each of the plurality of antenna ports is connected to a corresponding antenna. In some embodiments, the device includes a processor configured to set a configuration of the wireless interface, according to the indication.

In some embodiments, the wireless interface includes a first receiver circuitry and a second receiver circuitry. In some embodiments, the plurality of antenna ports include a first antenna port coupled to the first receiver circuitry and a second antenna port coupled to the second receiver circuitry.

In some embodiments, in response to the indication indicating that the first antenna port is connected to an antenna and the second antenna port is not connected to any antenna, the processor is configured to: enable the first receiver circuitry, and disable the second receiver circuitry. In some embodiments, in response to the indication indicating that the first antenna port is connected to an antenna and the second antenna port is not connected to any antenna, the processor is configured to set a first baseband gain setting of the first receiver circuitry to be higher than a second baseband gain setting of the second receiver circuitry. In some embodiments, in response to the indication indicating that the first antenna port is connected to an antenna and the second antenna port is not connected to any antenna, the processor is configured to set a first radio frequency (RF) gain setting of the first receiver circuitry to be higher than a second RF gain setting of the second receiver circuitry. In some embodiments, in response to the indication indicating that the first antenna port is connected to a first antenna and the second antenna port is connected to a second antenna, the processor is configured to enable the first receiver circuitry and the second receiver circuitry.

In some embodiments, the processor is configured to generate a channel state feedback, according to the indication, and can cause the wireless interface to transmit the channel state feedback to another device. In some embodiments, the channel state feedback includes at least one of channel quality indicator (CQI) or precoding matrix indicator (PMI).

Various embodiments disclosed herein are related to a method for wireless communication. In some embodiments, the method includes generating, by one or more sensors coupled to a plurality of antenna ports, an indication of whether each of the plurality of antenna ports is connected to a corresponding antenna. In some embodiments, the method includes setting, by a processor, a configuration of a wireless interface coupled to the plurality of antenna ports, according to the indication.

In some embodiments, the wireless interface includes a first receiver circuitry and a second receiver circuitry. In some embodiments, the plurality of antenna ports include a first antenna port coupled to the first receiver circuitry and a second antenna port coupled to the second receiver circuitry.

In some embodiments, setting, by the processor, the configuration of the wireless interface coupled to the plurality of antenna ports, according to the determination includes enabling the first receiver circuitry and disabling the second receiver circuitry, in response to the indication indicating that the first antenna port is connected to an antenna and the second antenna port is not connected to any antenna. In some embodiments, setting, by the processor, the configuration of the wireless interface coupled to the plurality of antenna ports, according to the determination includes setting, by the processor, a first baseband gain setting of the first receiver circuitry to be higher than a second baseband gain setting of the second receiver circuitry, in response to the indication indicating that the first antenna port is connected to an antenna and the second antenna port is not connected to any antenna. In some embodiments, setting, by the processor, the configuration of the wireless interface coupled to the plurality of antenna ports, according to the determination includes setting, by the processor, a first radio frequency (RF) gain setting of the first receiver circuitry to be higher than a second RF gain setting of the second receiver circuitry, in response to the indication indicating that the first antenna port is connected to an antenna and the second antenna port is not connected to any antenna. In some embodiments, setting, by the processor, the configuration of the wireless interface coupled to the plurality of antenna ports, according to the determination includes enabling the first receiver circuitry and the second receiver circuitry, in response to the indication indicating that the first antenna port is connected to a first antenna and the second antenna port is connected to a second antenna.

In some embodiments, the method includes generating, by the processor, a channel state feedback, according to the indication, and causing, by the processor, the wireless interface to transmit the channel state feedback. In some embodiments, the channel state feedback includes at least one of channel quality indicator (CQI) or precoding matrix indicator (PMI).

Various embodiments disclosed herein are related to a non-transitory computer readable medium storing instructions. In some embodiments, the instructions when executed by one or more processors cause the one or more processors to receive, from one or more sensors, an indication of whether each of a plurality of antenna ports is connected to a corresponding antenna, and set a configuration of a wireless interface coupled to the plurality of antenna ports, according to the indication.

In some embodiments, the wireless interface includes a first receiver circuitry and a second receiver circuitry. In some embodiments, the plurality of antenna ports include a first antenna port coupled to the first receiver circuitry and a second antenna port coupled to the second receiver circuitry. In some embodiments, the instructions when executed by the one or more processors that cause the one or more processors to set the configuration of the wireless interface coupled to the plurality of antenna ports, according to the determination include instructions when executed by the one or more processors cause the one or more processors to enable the first receiver circuitry and disable the second receiver circuitry, in response to the indication indicating that the first antenna port is connected to an antenna and the second antenna port is not connected to any antenna.

In some embodiments, the non-transitory computer readable medium further stores instructions when executed by the one or more processors cause the one or more processors to generate a channel state feedback, according to the indication, and cause the wireless interface to transmit the channel state feedback. In some embodiments, the channel state feedback includes at least one of channel quality indicator (CQI) or precoding matrix indicator (PMI).

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are related to adaptively configuring a wireless device, according to a connection status of one or more antennas. In one aspect, the wireless device includes a wireless interface, and a plurality of antenna ports coupled to the wireless interface. A wireless interface may be or include one or more transceivers. An antenna port may be a physical port, interface, circuitry, connector and/or a component, to which an antenna can be adaptively attached or connected to electrically couple the antenna to a transmitter and/or a receiver of the wireless interface. In one aspect, the wireless device includes one or more sensors coupled to the plurality of antenna ports. A sensor may be an electrical sensor or a mechanical sensor (e.g., contact/proximity sensor) that can detect or determine whether an antenna port is physically/conductively/electrically connected or attached to an antenna or not. The one or more sensors may be configured to generate and/or provide an indication or a signal indicating whether each of the plurality of antenna ports is connected to a corresponding antenna. For example, a first sensor can detect whether a first antenna port is connected to or attached to an antenna, and a second sensor can detect whether a second antenna port is connected to or attached to another antenna. In one aspect, the wireless device includes a processor configured to set a configuration of the wireless interface, according to the indication. For example, the wireless device can set gain settings of the wireless interface, according to the connection status of one or more antennas.

Advantageously, the disclosed system can improve the communication quality, when one or more antenna ports are not connected to any antenna. In one example, a first antenna port can be connected to an antenna, where a second antenna port is not connected to any antenna. The second antenna port may not be connected to any antenna, for example, while a second antenna is being replaced or repaired. When the second antenna port is not connected to any antenna, the second antenna port may be improperly terminated (e.g., not have 50-75 ohm impedance), such that noise or unwanted signal may be provided/coupled to the wireless interface through the second antenna port. Such noise or unwanted signal may degrade or interfere with communication through the first antenna port. In one aspect, the wireless interface may be automatically configured, according to the connection status/condition/state of antenna(s). For example, a receiver circuitry of the wireless interface coupled to or associated with a disconnected antenna port (or an antenna port not connected to any antenna) can be disabled (e.g., powered down, inactivated, and/or all input signals blocked). By selectively disabling a receiver circuitry coupled to the disconnected antenna port while enabling a receiver circuitry coupled to a connected antenna port (or an antenna port connected to an antenna), noise or unwanted signal through the receiver circuitry coupled to the disconnected antenna port can be reduced, blocked, suppressed or obviated. By reducing or obviating noise or unwanted signal through the receiver circuitry coupled to the disconnected antenna port, communication quality through the receiver circuitry coupled to the connected antenna port can be improved.

Figure 1:
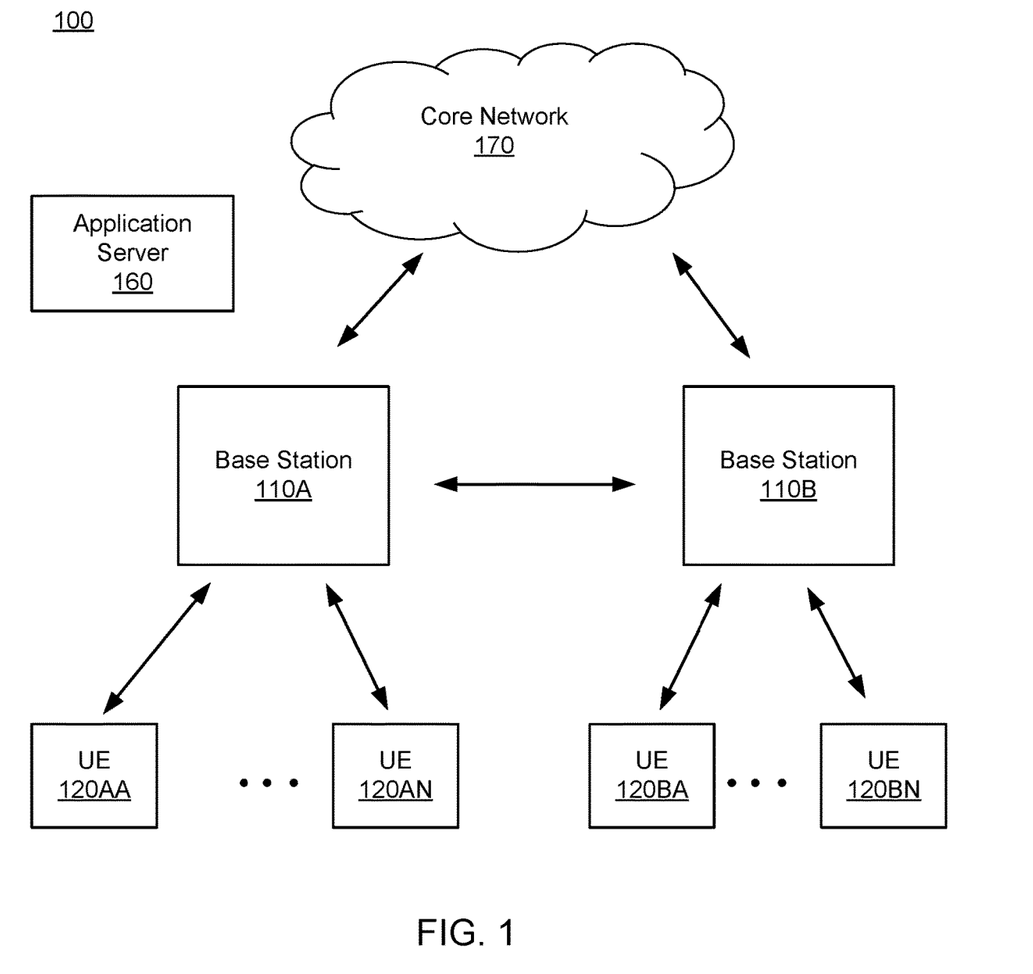
FIG. 1 is a diagram of an example wireless communication system, according to an example implementation of the present disclosure.

FIG. 1 illustrates an example wireless communication system 100. The wireless communication system 100 may include base stations 110A, 110B (also referred to as "wireless communication nodes 110" or "stations 110") and user equipments (UEs) 120AA . . . 120AN, 120BA . . . 120BN (also referred to as "wireless communication devices 120" or "terminal devices 120"). The wireless communication link may be a cellular communication link conforming to 3G, 4G, 5G or other cellular communication protocols. In one example, the wireless communication link supports, employs or is based on an orthogonal frequency division multiple access (OFDMA). In one aspect, the UEs 120AA . . . 120AN are located within a geographical boundary with respect to the base station 110A, and may communicate with or through the base station 110A. Similarly, the UEs 120BA . . . 120BN are located within a geographical boundary with respect to the base station 110B, and may communicate with or through the base station 110B. A network between UEs 120 and the base stations 110 may be referred to as radio access network (RAN). In some embodiments, the wireless communication system 100 includes more, fewer, or different number of base stations 110 than shown in FIG. 1.

In some embodiments, the UE 120 may be a user device such as a mobile phone, a smart phone, a personal digital assistant (PDA), tablet, laptop computer, wearable computing device (e.g., head mounted display, smart watch), etc. Each UE 120 may communicate with the base station 110 through a corresponding communication link. For example, the UE 120 may transmit data to a base station 110 through a wireless communication link (e.g., 3G, 4G, 5G or other cellular communication link), and/or receive data from the base station 110 through the wireless communication link (e.g., 3G, 4G, 5G or other cellular communication link). Example data may include audio data, image data, text, etc. Communication or transmission of data by the UE 120 to the base station 110 may be referred to as an uplink communication. Communication or reception of data by the UE 120 from the base station 110 may be referred to as a downlink communication.

In some embodiments, the base station 110 may be an evolved node B (eNB), a serving eNB, a target eNB, a femto station, or a pico station. The base station 110 may be communicatively coupled to another base station 110 or other communication devices through a wireless communication link and/or a wired communication link. The base station 110 may receive data (or a RF signal) in an uplink communication from a UE 120. Additionally or alternatively, the base station 110 may provide data to another UE 120, another base station, or another communication device. Hence, the base station 110 allows communication among UEs 120 associated with the base station 110, or other UEs associated with different base stations.

In some embodiments, the wireless communication system 100 includes a core network 170. The core network 170 may be a component or an aggregation of multiple components that ensures reliable and secure connectivity to the network for UEs 120. The core network 170 may be communicatively coupled to one or more base stations 110A, 110B through a communication link. A communication link between the core network 170 and a base station 110 may be a wireless communication link (e.g., 3G, 4G, 5G or other cellular communication link) or a wired communication link (e.g., Ethernet, optical communication link, etc.). In some embodiments, the core network 170 includes user plane function (UPF), access and mobility management function (AMF), policy control function (PCF), etc. The UPF may perform packet routing and forwarding, packet inspection, quality of service (QOS) handling, and provide external protocol data unit (PDU) session for interconnecting data network (DN). The AMF may perform registration management, reachability management, connection management, etc. The PCF may help operators (or operating devices) to easily create and seamlessly deploy policies in a wireless network. The core network 170 may include additional components for managing or controlling operations of the wireless network. In one aspect, the core network 170 may receive a message to perform a network congestion control, and perform the requested network congestion control. For example, the core network 170 may receive explicit congestion notification (ECN) from a base station 110 and/or a UE 120, and perform a network congestion control according to the ECN. For example, the core network 170 may adjust or control an amount of data generated, in response to the ECN. Additionally or alternatively, the core network 170 may adjust or control an amount of data transmitted and/or received, in response to the ECN.

In some embodiments, the wireless communication system 100 includes an application server 160. The application server 160 may be a component or a device that generates, manages, or provides content data. The application server 160 may be communicatively coupled to one or more base stations 110A, 110B through a communication link. A communication link between an application server 160 and a base station 110 may be a wireless communication link (e.g., 3G, 4G, 5G or other cellular communication link) or a wired communication link (e.g., Ethernet, optical communication link, etc.). In one aspect, an application server 160 may receive a request for data from a UE 120 through a base station 110, and provide the requested data to the UE 120 through the base station 110. In one aspect, an application server 160 may receive a message to perform a network congestion control, and perform the requested network congestion control. For example, the application server 160 may receive explicit congestion notification (ECN) from a base station 110, a UE 120, or a core network 170, and perform a network congestion control according to the ECN. For example, the application server 160 may adjust or control an amount of data generated, in response to the ECN. Additionally or alternatively, the application server 160 may adjust or control an amount of data transmitted and/or received, in response to the ECN.

In some embodiments, communication among the base stations 110, the UEs 120, application server 160, and the core network 170 is based on one or more layers of Open Systems Interconnection (OSI) model. The OSI model may include layers including: a physical layer, a Medium Access Control (MAC) layer, a Radio Link Control (RLC) layer, a Packet Data Convergence Protocol (PDCP) layer, a Radio Resource Control (RRC) layer, a Non Access Stratum (NAS) layer or an Internet Protocol (IP) layer, and other layer.

Figure 2:
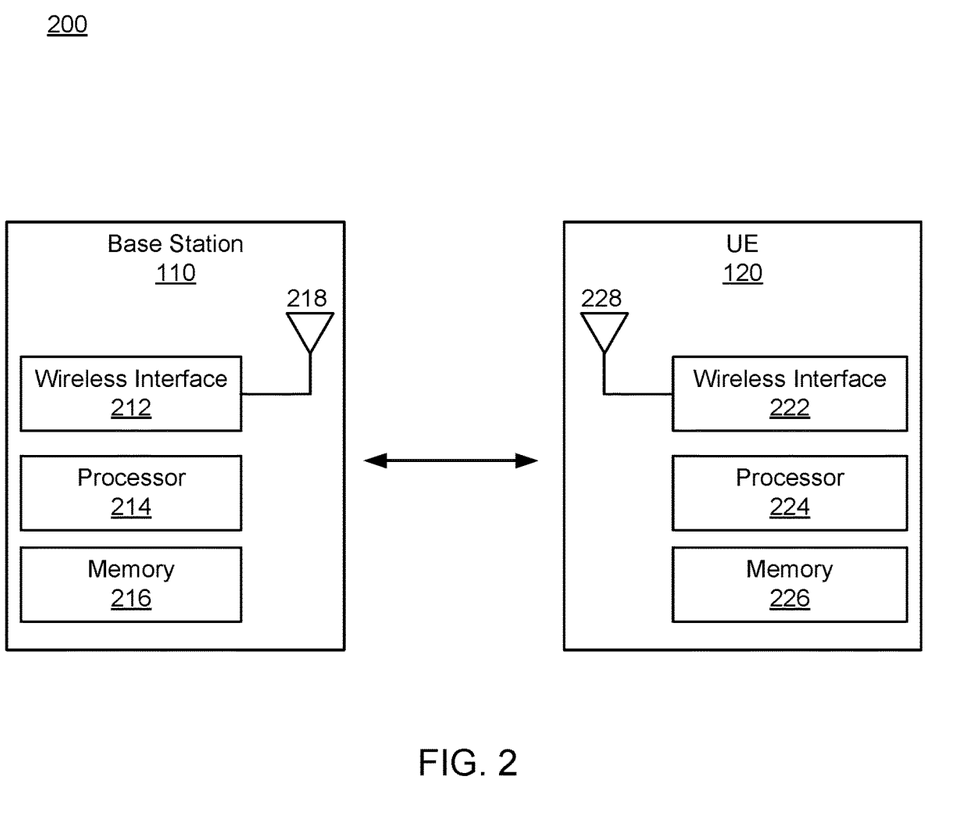
FIG. 2 is a diagram showing example components of a base station and a user equipment, according to an example implementation of the present disclosure.

FIG. 2 is a diagram showing example components of a base station 110 and a user equipment 120, according to an example implementation of the present disclosure. In some embodiments, the UE 120 includes a wireless interface 222, a processor 224, a memory device 226, and one or more antennas 228. These components may be embodied as hardware, software, firmware, or a combination thereof. In some embodiments, the UE 120 includes more, fewer, or different components than shown in FIG. 2. For example, the UE 120 may include an electronic display and/or an input device. For example, the UE 120 may include additional antennas 228 and wireless interfaces 222 than shown in FIG. 2.

The antenna 228 may be a component that receives a radio frequency (RF) signal and/or transmits a RF signal through a wireless medium (e.g., air). The RF signal may be at a frequency between 200 MHz to 100 GHz. The RF signal may have packets, symbols, or frames corresponding to data for communication. The antenna 228 may be a dipole antenna, a patch antenna, a ring antenna, or any suitable antenna for wireless communication. In one aspect, a single antenna 228 is utilized for both transmitting a RF signal and receiving a RF signal. In one aspect, different antennas 228 are utilized for transmitting the RF signal and receiving the RF signal. In one aspect, multiple antennas 228 are utilized to support multiple-in, multiple-out (MIMO) communication.

The wireless interface 222 includes or is embodied as a transceiver for transmitting and receiving RF signals through one or more antennas 228. The wireless interface 222 may communicate with a wireless interface 212 of the base station 110 through a wireless communication link. In one configuration, the wireless interface 222 is coupled to one or more antennas 228. In one aspect, the wireless interface 222 may receive the RF signal at the RF frequency received through an antenna 228, and downconvert the RF signal to a baseband frequency (e.g., 0~1 GHZ). The wireless interface 222 may provide the downconverted signal to the processor 224. In one aspect, the wireless interface 222 may receive a baseband signal for transmission at a baseband frequency from the processor 224, and upconvert the baseband signal to generate a RF signal. The wireless interface 222 may transmit the RF signal through the antenna 228.

The processor 224 is a component that processes data. The processor 224 may be embodied as field programmable gate array (FPGA), application specific integrated circuit (ASIC), a logic circuit, etc. The processor 224 may obtain instructions from the memory device 226, and execute the instructions. In one aspect, the processor 224 may receive downconverted data at the baseband frequency from the wireless interface 222, and decode or process the downconverted data. For example, the processor 224 may generate audio data or image data according to the downconverted data, and present an audio indicated by the audio data and/or an image indicated by the image data to a user of the UE 120. In one aspect, the processor 224 may generate or obtain data for transmission at the baseband frequency, and encode or process the data. For example, the processor 224 may encode or process image data or audio data at the baseband frequency, and provide the encoded or processed data to the wireless interface 222 for transmission.

The memory device 226 is a component that stores data. The memory device 226 may be embodied as random access memory (RAM), flash memory, read only memory (ROM), erasable programmable read-only memory (EPROM), electrically erasable programmable read-only memory (EEPROM), registers, a hard disk, a removable disk, a CD-ROM, or any device capable for storing data. The memory device 226 may be embodied as a non-transitory computer readable medium storing instructions executable by the processor 224 to perform various functions of the UE 120 disclosed herein. In some embodiments, the memory device 226 and the processor 224 are integrated as a single component.

In some embodiments, the base station 110 includes a wireless interface 212, a processor 214, a memory device 216, and one or more antennas 218. These components may be embodied as hardware, software, firmware, or a combination thereof. In some embodiments, the base station 210 includes more, fewer, or different components than shown in FIG. 2. For example, the base station 210 may include an electronic display and/or an input device. For example, the base station 210 may include additional antennas 218 and wireless interfaces 212 than shown in FIG. 2.

The antenna 218 may be a component that receives a radio frequency (RF) signal and/or transmits a RF signal through a wireless medium. The antenna 218 may be a dipole antenna, a patch antenna, a ring antenna, or any suitable antenna for wireless communication. In one aspect, a single antenna 218 is utilized for both transmitting a RF signal and receiving a RF signal. In one aspect, different antennas 218 are utilized for transmitting the RF signal and receiving the RF signal. In one aspect, multiple antennas 218 are utilized to support multiple-in, multiple-out (MIMO) communication.

The wireless interface 212 includes or is embodied as a transceiver for transmitting and receiving RF signals through one or more antennas 218. The wireless interface 212 may communicate with a wireless interface 222 of the UE 120 through a wireless communication link. In one configuration, the wireless interface 212 is coupled to one or more antennas 218. In one aspect, the wireless interface 212 may receive the RF signal at the RF frequency received through antenna 218, and downconvert the RF signal to a baseband frequency (e.g., 0~1 GHz). The wireless interface 212 may provide the downconverted signal to the processor 214. In one aspect, the wireless interface 212 may receive a baseband signal for transmission at a baseband frequency from the processor 214, and upconvert the baseband signal to generate a RF signal. The wireless interface 212 may transmit the RF signal through the antenna 218.

The processor 214 is a component that processes data. The processor 214 may be embodied as FPGA, ASIC, a logic circuit, etc. The processor 214 may obtain instructions from the memory device 216, and execute the instructions. In one aspect, the processor 214 may receive downconverted data at the baseband frequency from the wireless interface 212, and decode or process the downconverted data. For example, the processor 214 may generate audio data or image data according to the downconverted data. In one aspect, the processor 214 may generate or obtain data for transmission at the baseband frequency, and encode or process the data. For example, the processor 214 may encode or process image data or audio data at the baseband frequency, and provide the encoded or processed data to the wireless interface 212 for transmission. In one aspect, the processor 214 may set, assign, schedule, or allocate communication resources for different UEs 120. For example, the processor 214 may set different modulation schemes, time slots, channels, frequency bands, etc. for UEs 120 to avoid interference. The processor 214 may generate data (or UL CGs) indicating configuration of communication resources, and provide the data (or UL CGs) to the wireless interface 212 for transmission to the UEs 120.

The memory device 216 is a component that stores data. The memory device 216 may be embodied as RAM, flash memory, ROM, EPROM, EEPROM, registers, a hard disk, a removable disk, a CD-ROM, or any device capable for storing data. The memory device 216 may be embodied as a non-transitory computer readable medium storing instructions executable by the processor 214 to perform various functions of the base station 110 disclosed herein. In some embodiments, the memory device 216 and the processor 214 are integrated as a single component.

Figure 3:
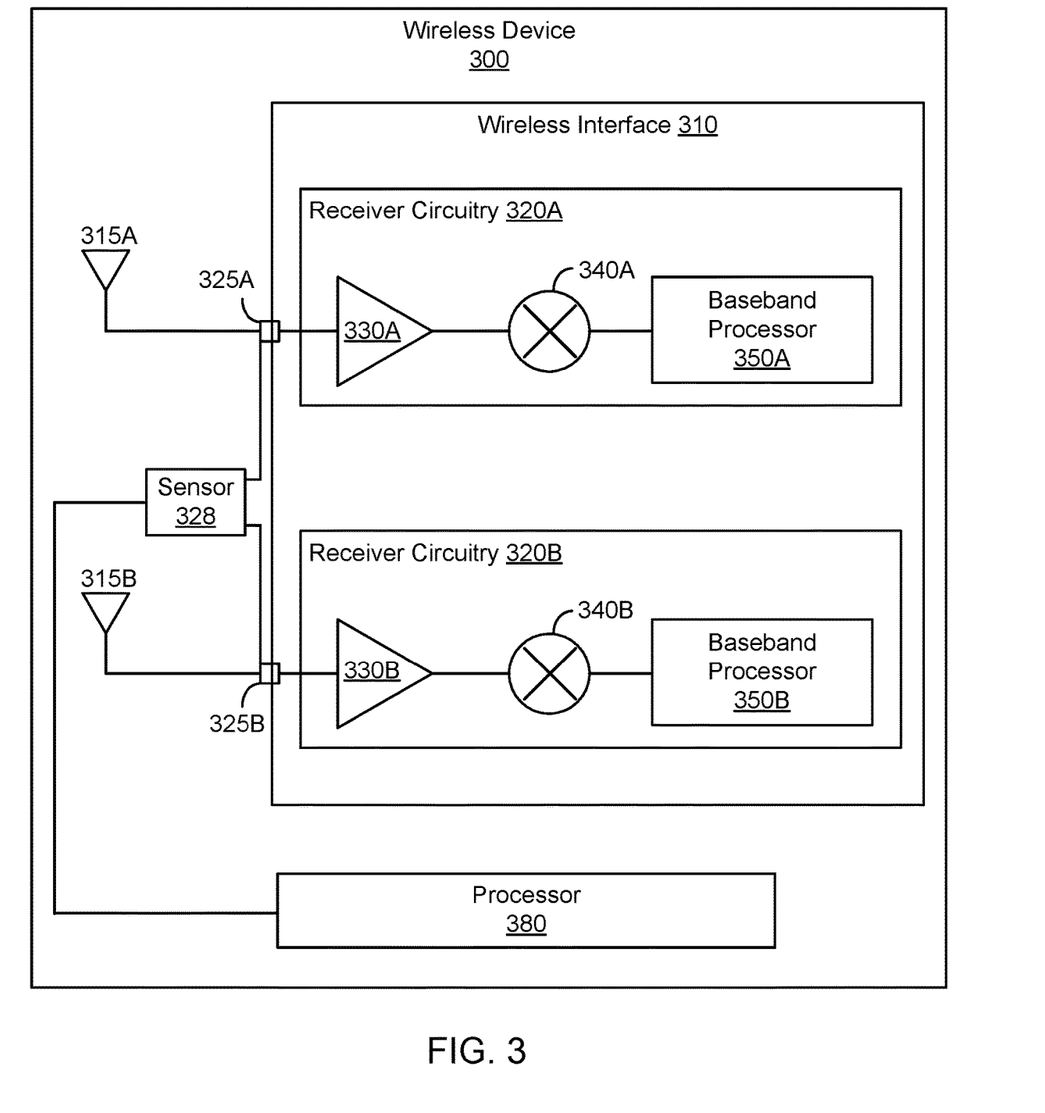
FIG. 3 is a diagram of a wireless device, according to an example implementation of the present disclosure.

FIG. 3 is a diagram of a wireless device 300, according to an example implementation of the present disclosure. The wireless device 300 can be the base station (or access point) 110, the UE (or station) 120, or any communication device. In some embodiments, the wireless device 300 includes antennas 315A, 315B, a sensor 328, a wireless interface 310, and/or a processor 380. These components may operate together to receive RF signals at a RF frequency through the antennas 315A, 315B, and can downconvert the RF signals to a baseband frequency (e.g., 0~1 GHZ). In some embodiments, the wireless device 300 includes more, fewer, or different components than shown in FIG. 3. For example, the wireless device 300 includes more antennas than shown in FIG. 3.

In some embodiments, each antenna 315 may be a component that receives a RF signal and/or transmits a RF signal through a wireless medium. Each antenna 315 may correspond to the antenna 218 or the antenna 228 of FIG. 2. The RF signal may be at a frequency between 200 MHz to 100 GHz. The RF signal may have packets, symbols, or frames corresponding to data for communication. Each antenna 315 may be a dipole antenna, a patch antenna, a ring antenna, an array antenna, or any suitable antenna for wireless communication. In some embodiments, the antennas 315A, 315B may have the same structural configuration (e.g., shape, size, dimension), and may be tuned for the same frequency band. In some embodiments, the antennas 315A, 315B may have different structural configurations, and may be tuned for the different frequency bands. In one aspect, the antennas 315A, 315B are utilized to support multiple-in, multiple-out (MIMO) communication.

In some embodiments, each antenna port 325 may be a physical port or a component, to which an antenna 315 can be adaptively attached or connected to electrically couple the antenna 315 to the wireless interface 310. In one example, each antenna port 325 includes a threaded nut, to which an antenna can be screwed. For example, the antenna 315A can be adaptively connected to or disconnected from the antenna port 325A, and the antenna 315B can be adaptively connected to or disconnected from the antenna port 325B. When the antenna 315A is connected to the antenna port 325A, a RF signal through a wireless medium (e.g., air) can be received by the antenna 315A, and can be provided to the wireless interface 310 through the antenna port 325A. Similarly, when the antenna 315B is connected to the antenna port 325B, a RF signal through a wireless medium can be received by the antenna 315B, and can be provided to the wireless interface 310 through the antenna port 325B.

In some embodiments, the sensor 328 is a component that detects a connection status of each antenna port. The sensor 328 may include a plurality of sensors, where each sensor is connected to a corresponding antenna port 325. The sensor 328 may be embodied as an electrical sensor, a mechanical sensor, or a combination of them. The sensor 328 may detect whether each antenna port 325 is connected to a corresponding antenna 315, and can generate an indication or a signal indicating whether the each antenna port 325 is connected to an antenna 315 or not. The sensor 328 may provide the indication or signal to the processor 380. For example, if the antenna port 325A is connected to the antenna 315A and if the antenna port 325B is disconnected from the antenna 315B (or any antenna), then the sensor 328 may generate an indication or signal indicating that the antenna port 325A is connected to an antenna and the antenna port 325B is not connected to any antenna. For example, if the antenna port 325A is connected to the antenna 315A and if the antenna port 325B is connected to the antenna 315B (or any antenna), then the sensor 328 may generate an indication or signal indicating that the antenna port 325A is connected to an antenna and the antenna port 325B is connected to another antenna.

In some embodiments, the wireless interface 310 is a component that transmits and/or receives RF signals through one or more antennas 315. The wireless interface 310 may correspond to the wireless interface 222 or the wireless interface 212 of FIG. 2. In one aspect, the wireless interface 310 includes or is embodied as a transceiver. In some embodiments, the wireless interface 310 includes receiver circuitries 320A, 320B. In some embodiments, the wireless interface 310 includes more, fewer, or different components than shown in FIG. 3. For example, the wireless interface 310 includes more receiver circuitries 320 than shown in FIG. 3. For example, the wireless interface 310 includes one or more transmitter circuitries.

In some embodiments, each receiver circuitry (or chain) 320 includes a low noise amplifier (LNA) 330, a mixer 340 (also referred to as a demodulator 340), and a baseband processor 350. The LNA 330 may be coupled to a corresponding antenna port 325. For example, the LNA 330A of the receiver circuitry 320A may be coupled to the antenna port 325A, and the LNA 330B of the receiver circuitry 320B may be coupled to the antenna port 325B. The LNA 330 may receive a RF signal at a RF frequency through a corresponding antenna port 325, and can amplify the received RF signal. The LNA 330 may provide the amplified RF signal to the mixer 340. The mixer 340 may downconvert the amplified RF signal to a baseband frequency (e.g., 0~1 GHz) to generate or obtain a downconverted signal. The mixer 340 may provide the downconverted signal to a baseband processor 350. The baseband processor 350 may perform various processes to obtain or extract content data from the downconverted data. Examples of the content data include audio data, image data, video data, text data, etc. that a transmitting device intended to transmit. For example, the baseband processor 350 may perform filtering, decoding, decompression, error correction, etc. to the downconverted data to obtain or extract the content data. The baseband processor 350 may provide the obtained or extracted content data to the processor 380. In some embodiments, the receiver circuitry 320 includes more, fewer, or different components than shown in FIG. 3. For example, the receiver circuitry 320 includes additional amplifiers, mixers, and/or filters.

In some embodiments, the processor 380 is a component that sets or configures operations of the wireless device 300. The processor 380 may be embodied as one or more FPGAs, ASICs, or any logic circuit. In some embodiments, the processor 380 and the baseband processors 350A, 350B are implemented as a single component and may correspond to the processor 214 or the processor 224 of FIG. 2. The processor 380 may execute one or more instructions stored by a non-transitory computer readable medium to perform various functions of the processor 380 or the wireless device 300 described herein. In one aspect, the processor 380 may receive content data from one or more receiver circuitries 320A, 320B.

In one aspect, the processor 380 may set configurations of the wireless interface 310, according to the connection status of one or more antennas 315. For example, the processor 380 may receive, from the sensor 328, an indication or a signal indicating whether each antenna port 325 is connected to a corresponding antenna 315. According to the indication or the signal, the processor 380 may set configurations of the wireless interface 310. For example, if the antenna port 325A is connected to the antenna 315A and the antenna port 325B is not connected to any antenna, the processor 380 may enable the receiver circuitry 320A connected to the antenna port 325A, and disable the receiver circuitry 320B connected to the antenna port 325B. In one approach, to enable the receiver circuitry 320A and disable the receiver circuitry 320B, the processor 380 may set a first baseband gain setting of the receiver circuitry 320A to be higher than a second baseband gain setting of the receiver circuitry 320B. For example, the gain setting of the mixer 340B and/or the base band processor 350B may be set to '0'. In one approach, to enable the receiver circuitry 320A and disable the receiver circuitry 320B, the processor 380 may set a first RF gain setting of the receiver circuitry 320A to be higher than a second RF gain setting of the receiver circuitry 320B. For example, the gain setting of the LNA 330B may be set to '0'. In one approach, if the antenna port 325A is connected to the antenna 315A and the antenna port 325B is connected to the antenna 315B, the processor 380 may enable the receiver circuitry 320A and the receiver circuitry 320B.

Advantageously, the wireless device 300 can improve the communication quality, when one or more antenna ports 325 are not connected to any antenna. When an antenna port (e.g., 325B) is not connected to any antenna, the antenna port (e.g., 325B) may be improperly terminated (e.g., not have 50-75 ohm impedance), such that noise or unwanted signal may be provided to the wireless interface 310 through the disconnected antenna port (e.g., 325B). Such noise or unwanted signal may degrade or interfere with communication through a connected antenna port (e.g., 325A) connected to an antenna (e.g., 315A). In one aspect, the wireless device 300 may be automatically configured, according to the connection status of antenna(s). For example, a receiver circuitry (e.g., 320B) of the wireless interface 310 coupled to or associated with a disconnected antenna port (e.g., 325B) not connected to any antenna can be disabled. By selectively disabling a receiver circuitry (e.g., 320B) coupled to the disconnected antenna port (e.g., 325B) while enabling a receiver circuitry (e.g., 320A) coupled to a connected antenna port (e.g., 325A) connected to an antenna (e.g., 315A), noise or unwanted signal through the receiver circuitry (e.g., 320B) coupled to the disconnected antenna port (e.g., 325B) can be reduced, suppressed, blocked or obviated. By reducing or obviating noise or unwanted signal through the receiver circuitry (e.g., 320B) coupled to the disconnected antenna port (e.g., 325B), communication quality through a receiver circuitry (e.g., 320A) coupled to the connected antenna port (e.g., 325A) can be improved.

In one approach, the processor 380 generates feedback information, according to the indication or the signal. For example, the processor 380 may generate a channel state feedback, according to the indication, and can cause the wireless interface 310 to transmit the channel state feedback to another wireless device. In some embodiments, the channel state feedback includes at least one of channel quality indicator (CQI) or precoding matrix indicator (PMI). The processor 380 may cause a transmitter (not shown in FIG. 3) of the wireless interface 310 to transmit the channel state feedback to the another device. In response to the channel state feedback, the another device may adjust or modify its transmission to the wireless device 300. For example, the another device may bypass or prevent transmission to the wireless device 300 through a frequency band associated with a disconnected antenna port (or antenna port not connected to any antenna). By bypassing or preventing transmission through a frequency band associated with a disconnected antenna port, the another device may reduce power consumption. In addition, by bypassing or preventing transmission through a frequency band associated with a disconnected antenna port, network congestion can be reduced or obviated.

Figure 4:
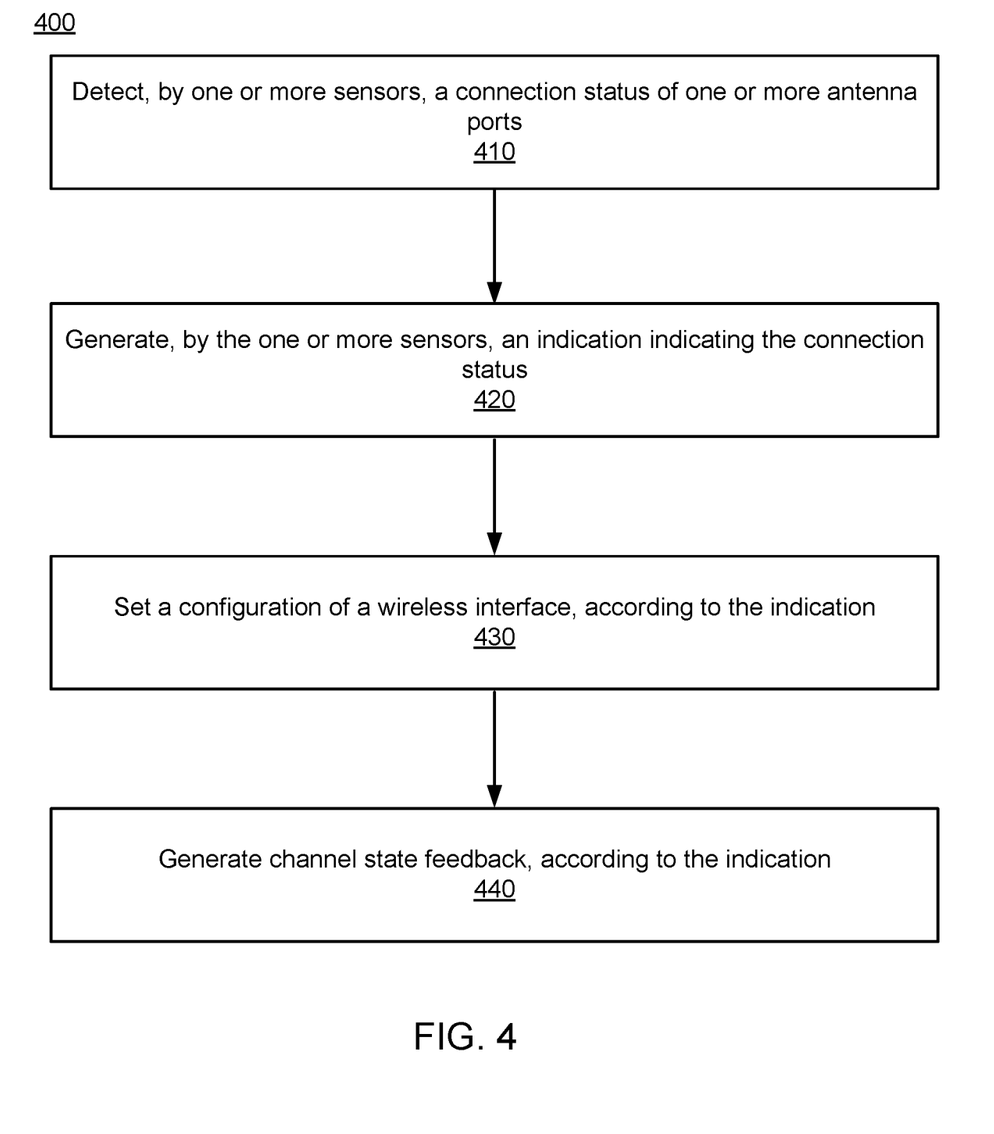
FIG. 4 is a flowchart showing a process of configuring a wireless device based on a connection status of one or more antennas, according to an example implementation of the present disclosure.

FIG. 4 is a flowchart showing a process 400 of configuring a wireless device based on a connection status of one or more antennas, according to an example implementation of the present disclosure. In some embodiments, the process 400 is performed by the wireless device 300. In some embodiments, the process 400 is performed by other entities. In some embodiments, the process 400 includes more, fewer, or different steps than shown in FIG. 4.

In one approach, one or more sensors (e.g., sensor 328) detect 410 a connection status of one or more antenna ports 325. The one or more sensors (e.g., sensor 328) may be embodied as electrical sensors, mechanical sensors, or a combination of them. The one or more sensors may detect whether each antenna port 325 is connected to a corresponding antenna 315, and generate an indication or a signal indicating whether the each antenna port 325 is connected to an antenna or not.

In one approach, the one or more sensors (e.g., sensor 328) can generate 420 an indication or a signal indicating the connection status of the one or more antenna ports 325. For example, if the antenna port 325A is connected to the antenna 315A and if the antenna port 325B is disconnected from the antenna 315B (or any antenna), then the one or more sensors (e.g., sensor 328) may generate an indication or signal indicating that the antenna port 325A is connected to an antenna and the antenna port 325B is not connected to any antenna. For example, if the antenna port 325A is connected to the antenna 315A and if the antenna port 325B is connected to the antenna 315B (or any antenna), then the one or more sensors (e.g., sensor 328) may generate an indication or signal indicating that the antenna port 325A is connected to an antenna and the antenna port 325B is connected to another antenna.

In one approach, the processor 380 receives the indication or the signal from the one or more sensors (e.g., sensor 328), and sets 430 a configuration of a wireless interface, according to the indication or the signal. For example, the processor 380 may receive an indication or a signal indicating whether each antenna port 325 is connected to a corresponding antenna 315. According to the indication or the signal, the processor 380 may set configurations of the wireless interface 310. For example, if the antenna port 325A is connected to the antenna 315A and the antenna port 325B is not connected to any antenna, the processor 380 may enable the receiver circuitry 320A connected to the antenna port 325A, and disable the receiver circuitry 320B connected to the antenna port 325B. In one approach, to enable the receiver circuitry 320A and disable the receiver circuitry 320B, the processor 380 may set a first baseband gain setting of the receiver circuitry 320A to be higher than a second baseband gain setting of the receiver circuitry 320B. For example, the gain setting of the mixer 340B and/or the base band processor 350B may be set to '0'. In one approach, to enable the receiver circuitry 320A and disable the receiver circuitry 320B, the processor 380 may set a first RF gain setting of the receiver circuitry 320A to be higher than a second RF gain setting (e.g., '0') of the receiver circuitry 320B. For example, the gain setting of the LNA 330B may be set to '0'. If the antenna port 325A is connected to the antenna 315A and the antenna port 325B is connected to the antenna 315B, the processor 380 may enable both the receiver circuitry 320A and the receiver circuitry 320B.

In one approach, the processor 380 generates 440 a channel state feedback, according to the indication, and cause the wireless interface 310 to transmit the channel state feedback to another wireless device. In some embodiments, the channel state feedback includes at least one of CQI or PMI. The processor 380 may cause the transmitter of the wireless interface 310 to transmit the channel state feedback to the another device. In response to the channel state feedback, the another device may adjust or modify its transmission to the wireless device 310. For example, the another device may bypass or prevent transmission to the wireless device 310 through a frequency band associated with a disconnected antenna port (or antenna port not connected to any antenna). By bypassing or preventing transmission through a frequency band associated with a disconnected antenna port, the another device may reduce power consumption. In addition, by bypassing or preventing transmission through a frequency band associated with a disconnected antenna port, network congestion can be reduced or obviated.

Advantageously, the wireless device 300 can improve the communication quality, when one or more antenna ports 325 are not connected to any antenna. When an antenna port (e.g., 325B) is not connected to any antenna, the antenna port may be improperly terminated (e.g., not have 50-75 ohm impedance), such that noise or unwanted signal may be provided to the wireless interface 310 through the disconnected antenna port. Such noise or unwanted signal may degrade or interfere with communication through an antenna port (e.g., 325A) connected to an antenna (e.g., 315A). In one aspect, the wireless device 300 may be automatically configured, according to the connection status of antenna(s). For example, a receiver circuitry (e.g., 320B) of the wireless interface 310 coupled to or associated with a disconnected antenna port (e.g., 325B) not connected to any antenna can be disabled/inactivated. By selectively disabling a receiver circuitry (e.g., 320B) coupled to the disconnected antenna port (e.g., 325B) while enabling a receiver circuitry (e.g., 320A) coupled to a connected antenna port (e.g., 325A) connected to an antenna (e.g., 315A), noise or unwanted signal through the receiver circuitry (e.g., 320B) coupled to the disconnected antenna port (e.g., 325B) can be reduced or obviated. By reducing, blocking or obviating noise or unwanted signal through the receiver circuitry (e.g., 320B) coupled to the disconnected antenna port (e.g., 325B), communication quality through a receiver circuitry (e.g., 320A) coupled to the connected antenna port (e.g., 325A) can be improved.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A device comprising:
   a wireless interface including a first receiver circuitry and a second receiver circuitry;
   a plurality of antenna ports coupled to the wireless interface, wherein the plurality of antenna ports include a first antenna port coupled to the first receiver circuitry and a second antenna port coupled to the second receiver circuitry;
   one or more sensors coupled to the plurality of antenna ports and separately disposed from the wireless interface, the one or more sensors configured to provide an indication of whether each of the plurality of antenna ports is connected to a corresponding antenna; and
   a processor configured to set a configuration of the wireless interface, according to the indication, wherein the configuration of the wireless interface includes gain settings of the first receiver circuitry and the second receiver circuitry.

2. The device of claim 1, wherein, in response to the indication indicating that the first antenna port is connected to an antenna and the second antenna port is not connected to any antenna, the processor is configured to:
   enable the first receiver circuitry, and
   disable the second receiver circuitry.

3. The device of claim 1, wherein, in response to the indication indicating that the first antenna port is connected to an antenna and the second antenna port is not connected to any antenna, the processor is configured to:
   set a first baseband gain setting of the first receiver circuitry to be higher than a second baseband gain setting of the second receiver circuitry.

4. The device of claim 1, wherein, in response to the indication indicating that the first antenna port is connected to an antenna and the second antenna port is not connected to any antenna, the processor is configured to:
   set a first radio frequency (RF) gain setting of the first receiver circuitry to be higher than a second RF gain setting of the second receiver circuitry.

5. The device of claim 1, wherein, in response to the indication indicating that the first antenna port is connected to a first antenna and the second antenna port is connected to a second antenna, the processor is configured to:
   enable the first receiver circuitry, and
   enable the second receiver circuitry.

6. The device of claim 1, wherein the processor is configured to:
   generate a channel state feedback, according to the indication, and
   cause the wireless interface to transmit the channel state feedback to another device.

7. The device of claim 6, wherein the channel state feedback includes at least one of channel quality indicator (CQI) or precoding matrix indicator (PMI).

8. A method comprising:
   generating, by one or more sensors coupled to a plurality of antenna ports and separately disposed from a wireless interface, an indication of whether each of the plurality of antenna ports is connected to a corresponding antenna, wherein the wireless interface includes a first receiver circuitry and a second receiver circuitry, and the plurality of antenna ports include a first antenna port coupled to the first receiver circuitry and a second antenna port coupled to the second receiver circuitry; and setting, by a processor, a configuration of the wireless interface coupled to the plurality of antenna ports, according to the indication, wherein the configuration of the wireless interface includes gain settings of the first receiver circuitry and the second receiver circuitry.

9. The method of claim 8, wherein setting, by the processor, the configuration of the wireless interface coupled to the plurality of antenna ports, according to the indication includes:

enabling the first receiver circuitry and disabling the second receiver circuitry, in response to the indication indicating that the first antenna port is connected to an antenna and the second antenna port is not connected to any antenna.

10. The method of claim 8, wherein setting, by the processor, the configuration of the wireless interface coupled to the plurality of antenna ports, according to the indication includes:

setting, by the processor, a first baseband gain setting of the first receiver circuitry to be higher than a second baseband gain setting of the second receiver circuitry, in response to the indication indicating that the first antenna port is connected to an antenna and the second antenna port is not connected to any antenna.

11. The method of claim 2, wherein setting, by the processor, the configuration of the wireless interface coupled to the plurality of antenna ports, according to the indication includes:

setting, by the processor, a first radio frequency (RF) gain setting of the first receiver circuitry to be higher than a second RF gain setting of the second receiver circuitry, in response to the indication indicating that the first antenna port is connected to an antenna and the second antenna port is not connected to any antenna.

12. The method of claim 8, wherein setting, by the processor, the configuration of the wireless interface coupled to the plurality of antenna ports, according to the indication includes:

enabling the first receiver circuitry and the second receiver circuitry, in response to the indication indicating that the first antenna port is connected to a first antenna and the second antenna port is connected to a second antenna.

13. The method of claim 8, further comprising:

generating, by the processor, a channel state feedback, according to the indication; and causing, by the processor, the wireless interface to transmit the channel state feedback.

14. The method of claim 13, wherein the channel state feedback includes at least one of channel quality indicator (CQI) or precoding matrix indicator (PMI).

15. A non-transitory computer readable medium storing instructions when executed by one or more processors cause the one or more processors to:

receive, from one or more sensors coupled to a plurality of antenna ports and separately disposed from a wireless interface, an indication of whether each of the plurality of antenna ports is connected to a corresponding antenna, wherein the wireless interface includes a first receiver circuitry and a second receiver circuitry, and the plurality of antenna ports include a first antenna port coupled to the first receiver circuitry and a second antenna port coupled to the second receiver circuitry, and set a configuration of the wireless interface coupled to the plurality of antenna ports, according to the indication, wherein the configuration of the wireless interface includes gain settings of the first receiver circuitry and the second receiver circuitry.

16. The non-transitory computer readable medium of claim 15, wherein the instructions when executed by the one or more processors that cause the one or more processors to set the configuration of the wireless interface coupled to the plurality of antenna ports, according to the indication include instructions when executed by the one or more processors cause the one or more processors to:

enable the first receiver circuitry and disable the second receiver circuitry, in response to the indication indicating that the first antenna port is connected to an antenna and the second antenna port is not connected to any antenna.

17. The non-transitory computer readable medium of claim 15, further storing instructions when executed by the one or more processors cause the one or more processors to:

generate a channel state feedback, according to the indication, and cause the wireless interface to transmit the channel state feedback.

18. The non-transitory computer readable medium of claim 17, wherein the channel state feedback includes at least one of channel quality indicator (CQI) or precoding matrix indicator (PMI).

* * * * *